(12) United States Patent  
Feilcke

(10) Patent No.: US 10,795,383 B2  
(45) Date of Patent: Oct. 6, 2020

(54) METHOD FOR REGULATING A VOLUME FLOW RATE AND TEST STAND FOR SIMULATING A LIQUID CIRCUIT

(71) Applicant: dSPACE digital signal processing and control engineering GmbH, Paderborn (DE)

(72) Inventor: Fabian Feilcke, Petershausen (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 0 days.

(21) Appl. No.: 15/640,624

(22) Filed: Jul. 3, 2017

(65) Prior Publication Data  
US 2018/0004236 A1 Jan. 4, 2018

(30) Foreign Application Priority Data

Jul. 1, 2016 (DE) .......................... 10 2016 112 093

(51) Int. Cl.  
*G05D 7/06* (2006.01)  
*F04B 51/00* (2006.01)  
(Continued)

(52) U.S. Cl.  
CPC ........... *G05D 7/0688* (2013.01); *F04B 51/00* (2013.01); *F28F 13/06* (2013.01); *G05D 23/1917* (2013.01)

(58) Field of Classification Search  
CPC .. G05D 7/0688; G05D 23/1917; F04B 51/00; F28F 13/06  
(Continued)

(56) References Cited

U.S. PATENT DOCUMENTS

| | | | | |
|---|---|---|---|---|
| 5,466,416 A | * | 11/1995 | Ghaed | G01N 21/69 250/361 C |
| 2006/0162466 A1 | * | 7/2006 | Wargo | G01F 1/363 73/861.63 |

(Continued)

FOREIGN PATENT DOCUMENTS

| | | |
|---|---|---|
| CN | 102094798 A | 6/2011 |
| CN | 103205993 A | 7/2013 |

(Continued)

OTHER PUBLICATIONS

The Engineering Tool Box—System Curve and Pump Performance Curve; Website. Published Dec. 2006. retrieved from https://www.engineeringtoolbox.com/pump-system-curves-d_635.html on Aug. 4, 2019 (Year: 2006).*

(Continued)

*Primary Examiner* — Mohammad Ali  
*Assistant Examiner* — Joshua T Sanders  
(74) *Attorney, Agent, or Firm* — Muncy, Geissler, Olds & Lowe, P.C.

(57) ABSTRACT

A method for regulating a volume flow rate, and a test stand with a liquid circuit for carrying out the method is provided. A pump and a flow control valve are connected in series in the liquid circuit, and the orifice width of the flow control valve is set as a function of a setpoint value of the volume flow rate of the liquid, in order to specify, on the basis of the orifice width, a characteristic curve of the pump that plots the volume flow rate over the differential pressure. Once a characteristic curve has been specified, the differential pressure of the pump is set such that the volume flow rate corresponds to the setpoint value of the volume flow rate.

18 Claims, 3 Drawing Sheets

(51) Int. Cl.
*F28F 13/06* (2006.01)
*G05D 23/19* (2006.01)

(58) Field of Classification Search
USPC .......................................................... 700/282
See application file for complete search history.

(56) References Cited

U.S. PATENT DOCUMENTS

| | | | | |
|---|---|---|---|---|
| 2014/0182692 | A1* | 7/2014 | Hirata | G01F 25/0007 137/10 |
| 2015/0276554 | A1* | 10/2015 | Vertenoeuil | G01N 33/28 73/116.03 |
| 2016/0136577 | A1* | 5/2016 | McGovern | B01D 61/12 |
| 2017/0364097 | A1* | 12/2017 | Weber | F16K 11/07 |

FOREIGN PATENT DOCUMENTS

| | | |
|---|---|---|
| DE | 199 12 588 A1 | 9/2000 |
| DE | 10 2013 001 413 A1 | 10/2013 |
| DE | 10 2013 204 607 A1 | 9/2014 |

OTHER PUBLICATIONS

Johnson Controls—Valve and Actuator Manual, Section Vb1:Valves; Copyright 1994. (Excerpted) Published on the internet at least by Feb. 2001; retrieved from https://cgproducts.johnsoncontrols.com/MET_PDF/347VB.PDF on Aug. 4, 2019 (Year: 1994).*
Benjamin, Mark, "Principles of Ideal Fluid Flow; the Bernoulli and Continuity Equations", University of Washington, CEE 342 Class Notes, Oct. 2005. Retrieved from: http://faculty.washington.edu/markbenj/CEE342/342-Class_notes_05.html on Mar. 11, 2020 ( Year: 2005).*
German Search Report for German Application No. 1020161120936 dated May 8, 2017 with English Translation.
Peter Oppinger, "Exact regulation of water supply installations with ring piston valves", The Industrial Valve Journal, (Mar. 1, 2011), pp. 1 and 40-43.
"Einstellen der Kennlinie einer elektronischen Pumpe mit Handsender R 100", IKZ Praxis, (Aug. 2004), pp. 1-2.
Chinese First Office Action issued by Chinese Patent Office dated Feb. 19, 2019 in corresponding application 201710518721.5.
Chinese Office Action dated Oct. 25, 2019 in corresponding application 201710518721.5.
Xiangwei: XIAN University Press, "Fluid machinery", Mar. 31, 2016, pp. 47-50.

* cited by examiner

METHOD FOR REGULATING A VOLUME FLOW RATE AND TEST STAND FOR SIMULATING A LIQUID CIRCUIT

This nonprovisional application claims priority under 35 U.S.C. § 119(a) to German Patent Application No. 10 2016 112 093.6, which was filed in Germany on Jul. 1, 2016, and which is herein incorporated by reference.

BACKGROUND OF THE INVENTION

Field of the Invention

The invention relates to liquid circuits for temperature regulation and a test stand with a liquid circuit for simulating temperature regulation.

Description of the Background Art

An embedded system is a computer system that generally is not reprogrammable by an end user and that is permanently built into a device in order to carry out control, regulation, or monitoring in the device. Embedded systems are often produced in the form of compact, autonomous units that communicate through interfaces with the devices into which they are built, and in that case are also referred to as electronic control units. Many embedded systems perform safety-related tasks, for example in automotive manufacture, in aerospace, and in the control of industrial robots. The software stored on embedded systems of this nature is extensively tested for error-free functioning prior to mass production of the system in question.

An established method for accomplishing this is hardware-in-the-loop simulation. In this method, a real-time capable simulation computer, or HIL for short (for hardware in the loop) is connected to the embedded system to be tested, hereinafter referred to as the unit under test, and is configured to process a software model for simulating an environment of the unit under test in hard real time. Using the software model, the HIL computes input data for the unit under test, for example simulated sensor values, and provides them to the unit under test through its data inputs. Conversely, the HIL reads output data of the unit under test, for example control signals for actuators, from the data outputs of the unit under test and processes the output data on the basis of the software model. Accordingly, the unit under test operates in a largely virtual environment and can be tested in this environment in a risk-free and reproducible manner. Oftentimes, HILs are also built in the form of test stands, in which case they contain additional physical, which is to say non-virtual, components—along with the unit under test itself—that likewise interact with the simulation computer. The additional physical components can be, in particular, components controlled by the unit under test, for example a motor, a controlled shock absorber, or a brake system.

SUMMARY OF THE INVENTION

The invention concerns the special case in which a cooling, heating, or temperature regulation of the embedded system by means of a liquid circuit is provided in the end product that the mass-produced embedded system is to be built into. In this case, the software model for simulating the environment of the unit under test will include a simulation of the liquid circuit. To correctly adjust its physical effect on the unit under test, the HIL needs a device for regulating the temperature of the unit under test in order to match the unit's actual temperature to the values specified by the software model, ideally in the form of a dedicated liquid circuit, so as to realistically simulate the environment of the embedded system in the end product. The liquid circuit should be configured to accurately simulate the specified values calculated by the software model, which is to say that it should be possible to accurately regulate the volume flow rate of the liquid, in addition to its temperature, over the widest possible interval. However, liquid circuits known from the prior art are not configured for this type of regulation of their volume flow rate.

It is therefore an object of the invention to provide a method for regulating the volume flow rate of a liquid circuit that advances the state of the art and permits regulation of the volume flow rate that is sufficiently accurate over a wide range of values for the requirements of a hardware-in-the-loop simulation. In particular, it is an object of the invention to describe a test stand with a liquid circuit for influencing the temperature of a unit under test that permits regulation of the temperature as well as the volume flow rate of the liquid circuit that is sufficiently accurate for the requirements of a hardware-in-the-loop simulation over a wide range of values.

In an exemplary embodiment of the invention, a method is provided for regulating the volume flow rate of a first liquid circuit having a liquid, wherein a pump and a flow control valve are connected in series in the first liquid circuit. The orifice width of the flow control valve, for example, the flow cross-section inside the flow control valve, is adjusted as a function of a setpoint value of the volume flow rate. Adjusting the orifice width of the flow control valve influences the characteristic curve of the pump, which plots the volume flow rate through the pump, or in the first liquid circuit, over the differential pressure of the pump. Once the flow control valve has been set to an orifice width, thereby setting a characteristic curve of the pump, the differential pressure of the pump is set such that the volume flow rate in the first liquid circuit corresponds to the setpoint value of the volume flow rate.

The differential pressure of the pump can be understood to mean the pressure difference on both sides of the pump that is established by the pump, and hence the pressure difference dropping across the entire first liquid circuit. As a basic principle, the differential pressure can thus be set by controlling the pumping power.

An advantage of the invention is that it improves the ability to regulate the volume flow rate in terms of its accuracy over a wide range of values. The characteristic curve of the pump as defined above is a square root function according to the following formula under idealized conditions:

$$V = A\sqrt{\frac{2}{D}P}$$

Wherein, V is a volume flow rate, A is a cross-sectional area of the flow, D is a density of the liquid, P is a dynamic pressure or differential pressure.

For a specified characteristic curve, a sufficiently accurate regulation of the volume flow rate by control of the differential pressure is only possible within a narrow interval of values of the differential pressure within which the shape of the characteristic curve is neither too steep nor too flat. By setting the orifice width of the flow control valve, however, it is possible to change the cross-sectional area A and to select a characteristic curve with a shape that is favorable for the current setpoint value of the volume flow rate from a theoretically unlimited number of characteristic curves.

In general, the stated formula applies only as an approximation, in particular because turbulent flow is possible inside the flow control valve. The characteristic curve does approximately describe a square root function under realistic assumptions as well, however.

Another advantage of the invention is that it permits regulation of the volume flow rate with a low differential pressure over a wide range of values, and in this way improves the safety of the test stand. With a specified characteristic curve, the flattening shape of the square root function would make it necessary for the pump to establish a high differential pressure in the case of a relatively high setpoint value of the volume flow rate in order to match the volume flow rate to the specified value. The hoses of the test stand would quickly reach their load limit, which would be dangerous, especially in view of the potentially high temperature of the liquid. The test stand according to the invention operates continuously with differential pressures significantly below 1 bar. This precludes pressure-induced bursting of the lines. If damage or a leak should nevertheless occur in the liquid lines of the test stand, no large jet of hot liquid will result.

For example, the orifice width of the flow control valve is set such that a critical value of the differential pressure is not exceeded. In an embodiment, the critical value is no higher than 1 bar, 0.5 bar, or 0.3 bar. The orifice width can be set such that the first derivative of the characteristic curve for the setpoint value of the differential pressure has a value that is favorable for regulating the volume flow rate by setting the differential pressure. This means that the first derivative of the characteristic curve should have a moderate value at the point of the differential pressure that corresponds to the setpoint value of the volume flow rate, which is to say the characteristic curve should be neither too flat nor too steep to permit accurate regulation of the volume flow rate at the aforementioned point.

The orifice width of the flow control valve can be chosen from a predefined selection of orifice widths, for example, a selection stored in the form of a digital list. To this end, in an exemplary embodiment a designated value interval of the volume flow rate is divided into a number of sufficiently small subintervals, and a characteristic curve is determined by measurement for each subinterval, each characteristic curve having a favorable shape within the entire relevant subinterval per the above definition, or in other words the first derivative thereof has a value within the entire relevant subinterval that is favorable for regulating the volume flow rate without exceeding the critical value of the differential pressure, and the orifice width of the flow control valve corresponding to the characteristic curve determined for every subinterval is recorded. In this way, a table is produced that assigns an orifice width of the flow control valve to each subinterval. The table is stored in the test stand as a digital table. By means of the table, an orifice width of the flow control valve is read out for the setpoint value of the volume flow rate and the flow control valve is set according to the orifice width that has been read out.

In an embodiment, the temperature of the liquid can be regulated by means of a number of Peltier elements. Peltier elements can be used for both heating and cooling the liquid by reversing the voltage applied to the Peltier elements, and their heating or cooling performance can be regulated in a simple manner by scaling or pulse-width modulating the applied voltage. As a result, Peltier elements are well suited for installation in a HIL, since a typical HIL is natively designed to output analog and pulse-width modulated electrical signals, including those with high power.

The setpoint value of the volume flow rate and a setpoint value for the temperature can be computed by a processor on the basis of a software model. For example, the processor is built into a simulator, in particular into a HIL, wherein the flow control valve, the pump, and the number of Peltier elements are controlled by the simulator, and the temperature of a unit under test is influenced by means of the first liquid circuit.

In an exemplary embodiment of the invention, a test stand is provided for simulating a liquid circuit for temperature regulation, which has a first liquid circuit with a liquid, as well as a pump and a flow control valve that are connected in series in the first liquid circuit, and which test stand is configured to carry out the described method, wherein, the test stand can be configured to accommodate a unit under test and to influence the temperature of the unit under test by means of the first liquid circuit.

A storage tank for the liquid can be incorporated in both the first liquid circuit and in a second liquid circuit, wherein the storage tank and the fill level of the liquid are sized such that the great majority of the liquid is located in the storage tank at any point in time, and wherein Peltier elements for regulating the temperature of the liquid in the storage tank are located on the second liquid circuit.

The test stand can be divided into two separate components, wherein the processor is built into a first component and the unit under test is built into the first component or the first component is configured to accommodate the unit under test, and wherein the hydraulics of the test stand, apart from the first liquid circuit, which is to say the pump and the flow control valve in particular, are built into a second component, wherein the first liquid circuit is routed between the first component and the second component. This construction is advantageous in that, for example, the second component, in which the method according to the invention is substantially implemented, is autonomous and thus can be reused or duplicated for other test stands in a simple way, and the electrical system and the hydraulics of the test stand are separated to the best degree possible, which improves the safety of the test stand.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
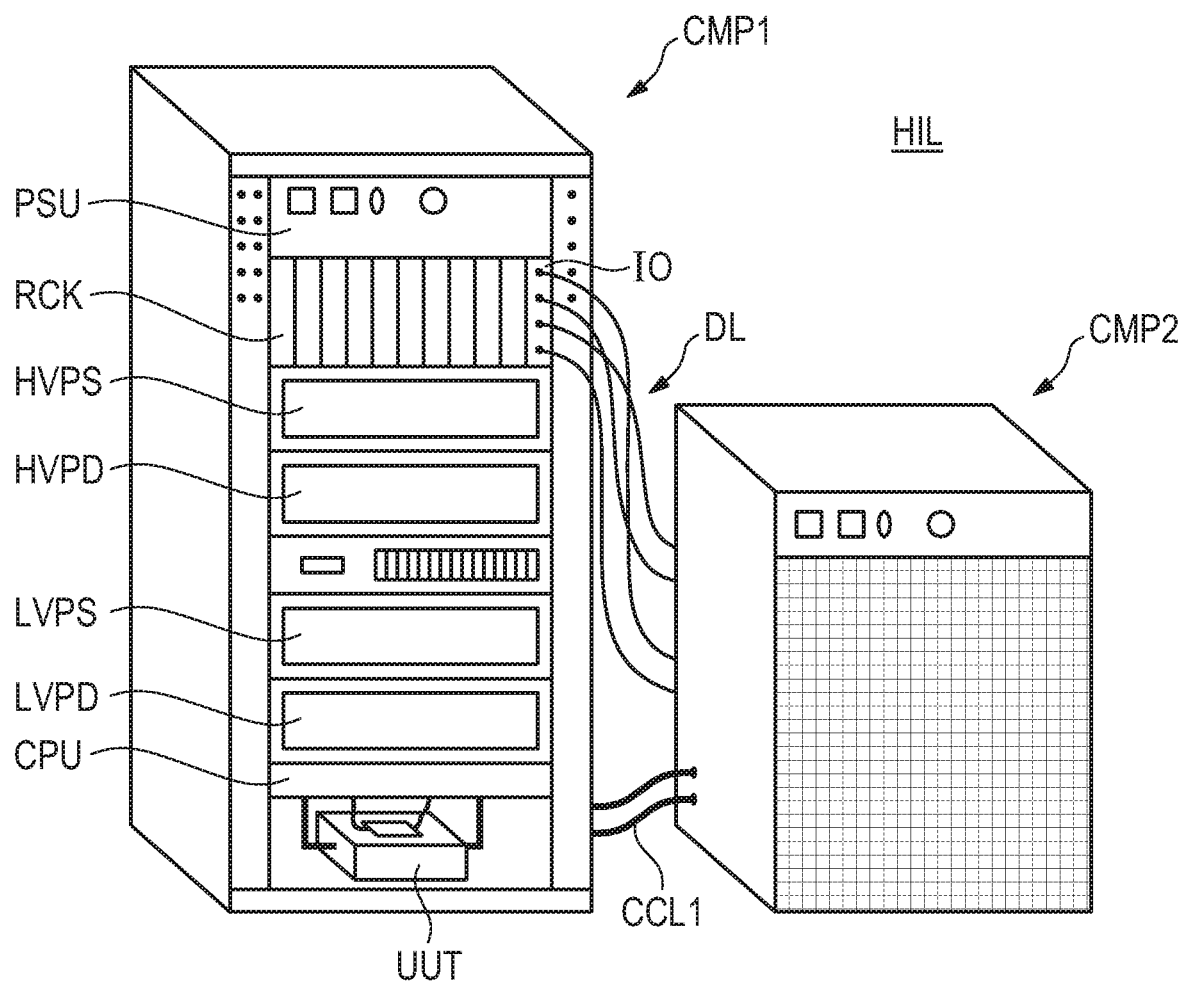
FIG. 1 is a representation of a test stand according to an embodiment of the invention.

The illustration in FIG. 1 shows a perspective representation of a test stand HIL designed as a hardware-in-the-loop simulator with a unit under test UUT. In the application example shown, the unit under test UUT is an intelligent DC-to-DC converter for a battery cell of a hybrid vehicle. The intelligent DC-to-DC converter has an integrated electronic control unit with a dedicated processor, which is to say that the actual DC-to-DC converter and the control unit for controlling the DC-to-DC converter are designed as an inseparable unit. The intelligent DC-to-DC converter is also equipped with a water passage, and is designed to be built into a water circuit for cooling the intelligent DC-to-DC converter.

The test stand HIL is constructed of two separate components. The processor unit CPU with the processor of the test stand HIL and the unit under test UUT are built into a first component CMP1. Also built into the first component are: a power supply unit PSU, a plug-in chassis RCK for a multiplicity of plug-in circuit boards, in particular I/O cards and cards for supporting and reducing the load on the processor CPU, and an electrical system for simulating the electrical environment of the unit under test UUT in the production vehicle in physical form. In particular, the electrical system has: a high-voltage power supply HVPS as the voltage source for the high-voltage side of the DC-to-DC converter UUT, a high-voltage load as an energy sink for the high-voltage side of the DC-to-DC converter UUT, a low-voltage power supply LVPS as the voltage source for the low-voltage side of the DC-to-DC converter UUT, and a low-voltage load LVPD as an energy sink for the low-voltage side of the DC-to-DC converter UUT.

The processor unit CPU of the test stand HIL is programmed with a software model to simulate an environment of the unit under test in hard real time, to provide input data to the unit under test on the basis of the software model, and to take into account output data from the unit under test during processing of the software model.

Hydraulics are built into a second component CMP2 in order to reproduce in physical form the water cooling of the unit under test simulated by the software model. A first liquid circuit CCL1, filled with liquid water, is routed between the first component CMP1 and the second component CMP2. The unit under test UUT is incorporated by means of its water passage into the first liquid circuit CCL1, so that the temperature of the unit under test UUT is influenced by means of the first liquid circuit CCL1.

An I/O card 10 is inserted in the plug-in chassis RCK, and the first component CMP1 is designed to exchange data between the processor unit CPU and a peripheral device of the first component CMP1 via the I/O card 10. A data link DL is established between the I/O card 10 and the second component CMP2 by means of data cables, and the test stand HIL is configured to use the data link DL to transmit control signals for actuators to the second component CMP2 and to transmit sensor values from the second component CMP2 to the processor unit CPU.

Figure 2:
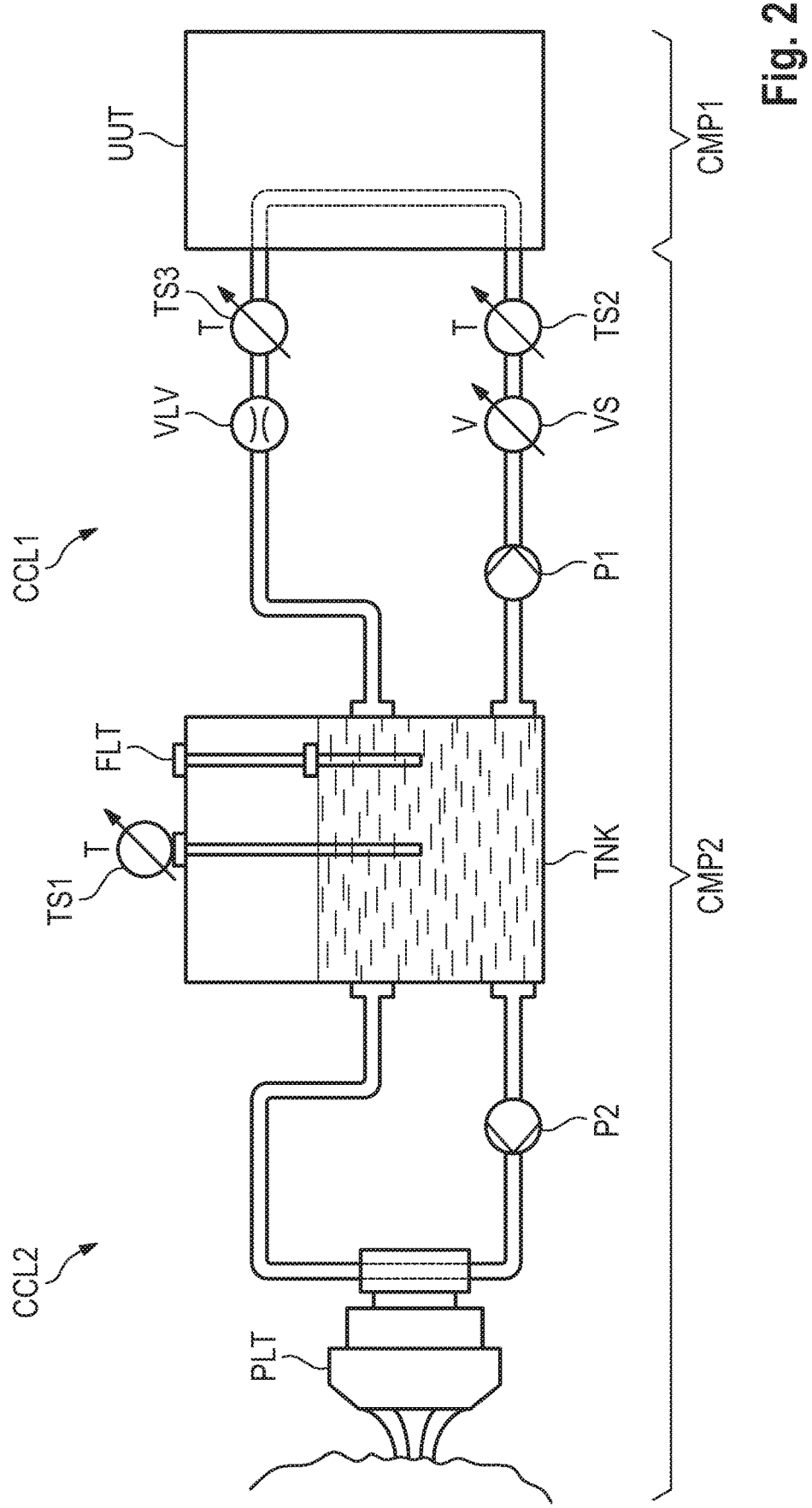
FIG. 2 is a schematic representation of the hydraulics built into the test stand for influencing the temperature of the unit under test.

In a schematic representation, the illustration in FIG. 2 shows the hydraulics of the test stand HIL with the first liquid circuit CCL1 and a second liquid circuit CCL2. With the exception of one portion of the piping or hose lines of the first liquid circuit CCL1, the entire hydraulic system, in particular all components located spatially above the bracket labeled CMP2 in the illustration, is built into the second component CMP2. A storage tank TNK for the water is incorporated in the first liquid circuit CCL1 as well as in the second liquid circuit CCL2, and contains the great majority of the water in the hydraulic system. A first temperature sensor TS1, which is read by the processor unit CPU, measures the temperature of the water in the storage tank TNK. A float switch FLT measures the water level in the storage tank TNK, and is configured to turn off the test stand HIL if the water level drops.

The first liquid circuit CCL1 is routed between the first component CMP1 and the second component CMP2, and runs through the water passage of the unit under test UUT. A first pump P1 controlled by the first component CMP1 and a flow control valve VLV controlled by the first component CMP1 are connected in series in the first liquid circuit CCL1. The first pump P1 is located ahead of the flow control valve VLV with respect to the flow direction of the water in the first liquid circuit CCL1. A volume flow rate sensor VS, a second temperature sensor TS2, and a third temperature sensor TS3 are arranged on the first liquid circuit CCL1, and are read by the processor unit CPU. The volume flow rate sensor VS measures the volume flow rate in the first liquid circuit. The second temperature sensor TS2 measures the water temperature ahead of the unit under test UUT, and the third temperature sensor TS3 measures the water temperature after the unit under test UUT. The processor unit CPU is configured to compute the energy balance, in particular the waste heat, of the unit under test UUT by means of the second temperature sensor TS2 and the third temperature sensor TS3.

On the basis of the software model, the processor unit computes a setpoint value for the volume flow rate in the first liquid circuit CCL1, and controls the flow control valve VLV as a function of the setpoint value of the volume flow rate so as to set a characteristic curve of the first pump P1. The processor unit CPU is configured to control the pump output of the first pump P1 so as to set the volume flow rate in the first liquid circuit such that the volume flow rate read in by the volume flow rate sensor VS corresponds to the setpoint value of the volume flow rate. The setpoint value of the volume flow rate computed by the software model is not a constant, but rather a variable quantity, and the processor unit CPU is configured to dynamically match the volume flow rate in the first liquid circuit CCL1 to the variable setpoint value of the volume flow rate.

The processor unit CPU is additionally configured to compute a setpoint value for the temperature of the water in the first liquid circuit CCL1 by means of the software model, and the second liquid circuit CCL2 is configured to regulate the temperature of the water in the storage tank TNK. A second pump P2 is arranged in the second liquid circuit CCL2, and is not controlled by the processor unit CPU, but instead operates with a constant pumping power. A number of Peltier elements PLT, represented in the drawing by a single Peltier element, are arranged on the second liquid circuit CCL2 in order to heat or cool the water in the second liquid circuit CCL2 as needed. The processor unit CPU is configured to read the water temperature in the first liquid circuit by means of the first temperature sensor TS1 and the second temperature sensor TS2, and to dynamically match the variable setpoint value for the temperature computed by means of the software model by controlling the Peltier elements PLT.

The Peltier elements PLT are coupled to the second liquid circuit CCL2 by means of a heat exchanger plate. In order to facilitate cooling of the water to below room temperature, the heat exchanger plate and the Peltier elements PLT are arranged to be suspended, and in particular are not attached to the housing wall of the second component CMP2. The waste heat of the Peltier elements PLT is removed from the second component CMP2 by fans.

Figure 3:
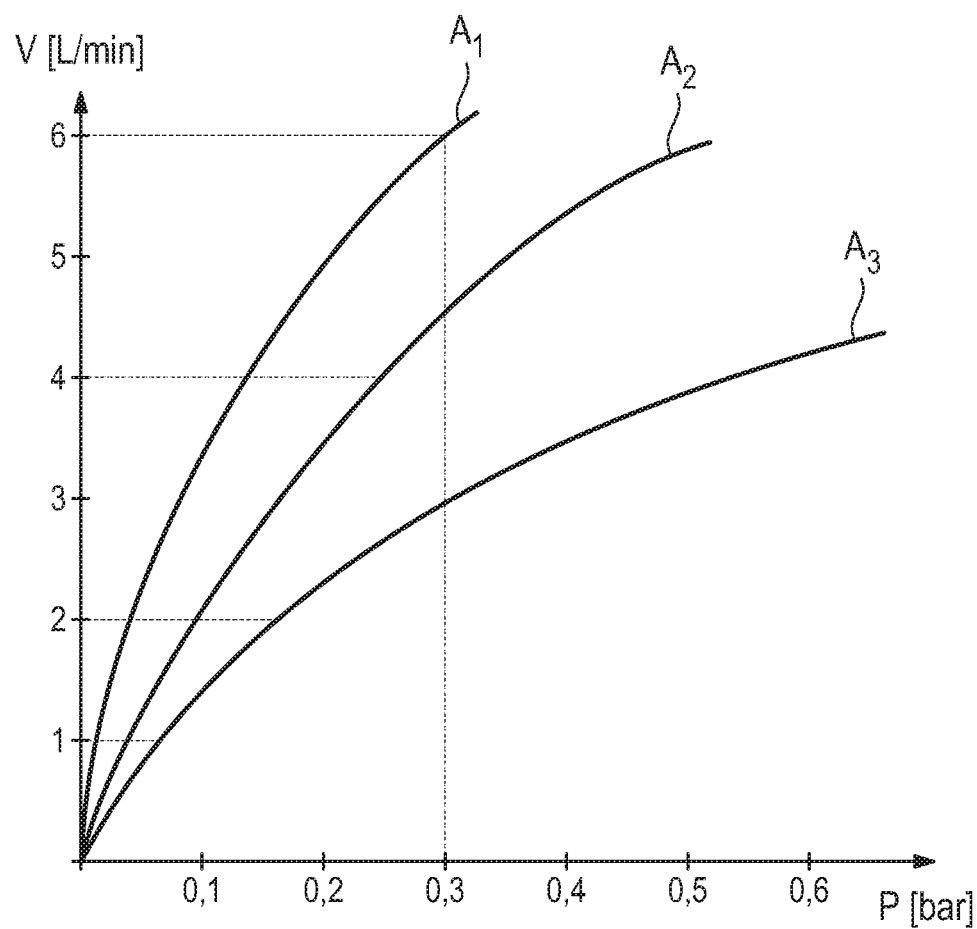
FIG. 3 is a drawing of the characteristic curves of the pump as a function of the orifice width of the flow control valve.

Using a characteristic curve diagram of the first pump, the illustration in FIG. 3 shows the generation of a predefined selection of orifice widths of the flow control valve VLV. The characteristic curves shown in the diagram are examples and do not represent genuine characteristic curves or measurements that were actually carried out. The illustration serves merely to provide direction to the person skilled in the art for generating a predefined selection of orifice widths. To reproduce the disclosed exemplary embodiment of the test stand according to the invention, it is necessary to ascertain suitable characteristic curves of the first pump or to determine them by measurement.

The characteristic curve diagram shows three characteristic curves of the first pump P1 as a plot of the volume flow rate in the first liquid circuit CCL1, measured in liters per minute, over the differential pressure of the first pump P1, measured in bar, for three different cross-sectional areas $A_1, \ldots, A_3$ of the flow in the flow control valve VLV. By way of example, three different cross-sectional areas or orifice widths of the flow control valve VLV are provided, depending on the current setpoint value of the volume flow rate: a first cross-sectional area $A_1$ for heavy volume flow rates in the range from 4 to 6 L/min, a second cross-sectional area $A_2$ for volume flow rates in the range from 2 to 4 L/min, and a third cross-sectional area $A_3$ for light volume flow rates in the range from 1 to 2 L/min. The cross-sectional areas are chosen such that the applicable characteristic curve is neither too flat nor too steep within the volume flow rate interval assigned to the applicable cross-sectional area, i.e. the first derivative of the characteristic curve has a moderate value within the entire interval, and such that the differential pressure corresponding to the applicable setpoint value of the volume flow rate never exceeds a value of 0.3 bar.

It is a matter of course that an essentially arbitrary number of predefined orifice widths can be defined, depending on the requirements and exact construction of a specific test stand. The predefined selection of orifice widths is stored in the form of a digital table that assigns the predefined orifice widths to their applicable volume flow rate intervals, in a memory that can be read by the processor unit CPU. In order to match the volume flow rate to the applicable current setpoint value of the volume flow rate, the processor unit is configured to read out the flow control valve orifice width assigned to the current setpoint value of the volume flow rate, to set the flow control valve accordingly, and then to match the volume flow rate to the setpoint value of the volume flow rate by controlling the first pump.

A test stand constructed by the applicant based on the disclosed exemplary embodiment has 16 Peltier elements with a rating of 56 W each. The said test stand is capable of regulating the volume flow rate in a range from 1 L/min to 6 L/min and the temperature in a range from 10° C. to 80° C. with sufficient accuracy for the requirements of a hardware-in-the-loop simulation while never exceeding a differential pressure of 0.3 bar. The investigations that preceded the design have demonstrated that it is not possible to achieve regulation meeting these requirements using pump systems available on the market without additional measures, e.g., the use according to the invention of a flow control valve.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for regulating a volume flow rate of a first liquid circuit having a liquid, the method comprising:
   connecting a pump and a flow control valve in series in the first liquid circuit;
   measuring the volume flow rate;
   computing a setpoint value for the volume flow rate of the liquid;
   setting an orifice width of the flow control valve as a function of the setpoint value, such that a first derivative of a characteristic curve, which plots the volume flow rate over a differential pressure of the pump, has a value that, at the setpoint value of the volume flow rate, is favorable for regulating the volume flow rate by setting the differential pressure in that the characteristic curve, at the setpoint value for the volume flow rate, is neither too flat nor too steep to permit accurate regulation of the volume flow rate by setting the differential pressure; and
   setting the differential pressure of the pump such that the volume flow rate substantially corresponds to the setpoint value of the volume flow rate,
   wherein the orifice width of the flow control valve is selected from a predefined selection of orifice widths stored in a digital list,
   wherein a designated value interval of the volume flow rate is divided into a number of subintervals, and a characteristic curve is determined by measurement for each subinterval, and
   wherein the first derivative of each characteristic curve has a value within an entire relevant subinterval that is favorable for regulating the volume flow rate without exceeding a critical value of the differential pressure, and the orifice width of the flow control valve corresponding to the characteristic curve determined for every subinterval is recorded.

2. The method according to claim 1, wherein the orifice width is set such that the differential pressure does not exceed a predefined critical value, and
   wherein the predefined critical value is no higher than 0.5 bar.

3. The method according to claim 1, wherein a temperature of the liquid is regulated by at least one Peltier element.

4. The method according to claim 3, wherein the setpoint value of the volume flow rate and a setpoint value for the temperature of the liquid are computed by a processor based on a software model.

5. The method according to claim 4, wherein the processor is built into a simulator or a hardware-in-the-loop simulator,
   wherein the simulator or the hardware-in-the-loop simulator controls the flow control valve, the pump, and the at least one Peltier element, and
   wherein a temperature of a unit under test is influenced by the first liquid circuit.

6. The method according to claim 1, wherein the orifice width is set such that the differential pressure does not exceed a predefined critical value, and
   wherein the predefined critical value is no higher than 1.0 bar.

7. The method according to claim 1, wherein the orifice width is set such that the differential pressure does not exceed a predefined critical value, and
wherein the predefined critical value is no higher than 0.3 bar.

8. The method according to claim 1, further comprising: reading the setpoint value of the volume flow rate.

9. The method according to claim 1, wherein a temperature of a unit under test is influenced by the first liquid circuit.

10. The method according to claim 1, wherein the characteristic curve of the pump is a square root function according to the following formula under idealized conditions:

$$V = A\sqrt{\frac{2}{D}P}$$

wherein, V is a volume flow rate, A is a cross-sectional area of the flow, D is a density of the liquid and P is a dynamic pressure or differential pressure.

11. A test stand for simulating a liquid circuit for temperature regulation, the test stand comprising:
a first liquid circuit with a liquid;
a pump;
a sensor configured to measure a volume flow rate of the liquid;
a processor configured to compute a setpoint value for the volume flow rate of the liquid; and
a flow control valve, the pump and the flow control valve being connected in series in the first liquid circuit,
wherein the test stand is configured to read in the setpoint value of the volume flow rate of the liquid and set an orifice width, such that a first derivative of a characteristic curve, which plots the volume flow rate over a differential pressure of the pump, has a value that, at the setpoint value of the volume flow rate, is favorable for regulating the volume flow rate by setting the differential pressure in that the characteristic curve, at the setpoint value for the volume flow rate, is neither too flat nor too steep to permit accurate regulation of the volume flow rate by setting the differential pressure,
wherein the test stand adjusts the differential pressure of the pump such that the volume flow rate substantially corresponds to the setpoint value of the volume flow rate,
wherein the orifice width of the flow control valve is selected from a predefined selection of orifice widths stored in a digital list,
wherein a designated value interval of the volume flow rate is divided into a number of subintervals, and a characteristic curve is determined by measurement for each subinterval, and
wherein the first derivative of each characteristic curve has a value within an entire relevant subinterval that is favorable for regulating the volume flow rate without exceeding a critical value of the differential pressure, and the orifice width of the flow control valve corresponding to the characteristic curve determined for every subinterval is recorded.

12. The test stand according to claim 11, wherein the test stand reads in a setpoint value of a temperature of the liquid, and regulates the temperature of the liquid by at least one Peltier element.

13. The test stand according to claim 12, wherein a storage tank for the liquid is incorporated in the first liquid circuit and in a second liquid circuit, and
wherein the at least one Peltier element is located on the second liquid circuit.

14. The test stand according to claim 11, wherein a processor for processing a software model is built into the test stand, and
wherein the test stand determines the setpoint value for the volume flow rate and the setpoint value of the temperature of the liquid via a software model.

15. The test stand according to claim 11, wherein the test stand is configured to accommodate a unit under test and to influence a temperature of the unit under test by the first liquid circuit.

16. The test stand according to claim 15, wherein the test stand has two separate components,
wherein the processor is built into a first component, wherein the unit under test is built into the first component or the first component is configured to accommodate the unit under test,
wherein the pump and the flow control valve are built into a second component, and
wherein the first liquid circuit is routed between the first component and the second component.

17. The test stand according to claim 11, wherein the test stand is configured to select the orifice width from the predefined selection of orifice widths as the function of the setpoint value of the volume flow rate.

18. The test stand according to claim 11, wherein a table is produced that assigns an orifice width of the flow control valve to each subinterval, and
wherein an orifice width of the flow control valve is read out from the table for the setpoint value of the volume flow rate and the flow control valve is set according to the orifice width that has been read out.

* * * * *